United States Patent [19]

Van Fossen

[11] 3,995,661
[45] Dec. 7, 1976

[54] FLOW CONTROL VALVE FOR MAGNETIC PARTICULATE

[75] Inventor: Harvey Van Fossen, Mishawaka, Ind.

[73] Assignee: Wheelabrator-Frye, Inc., Mishawaka, Ind.

[22] Filed: Sept. 22, 1975

[21] Appl. No.: 616,173

[52] U.S. Cl. .................................. 137/807; 137/13; 251/65; 251/305
[51] Int. Cl.² ........................................ F16K 1/226
[58] Field of Search ............... 137/1, 251, 807, 13, 137/827; 251/305, 139, 65

[56] References Cited
UNITED STATES PATENTS

| | | | |
|---|---|---|---|
| 3,120,943 | 2/1964 | Donelar | 251/139 |
| 3,395,720 | 8/1968 | Brooks | 137/807 X |
| 3,397,927 | 8/1968 | Oles | 251/305 X |
| 3,506,023 | 4/1970 | Bogart | 137/807 |
| 3,661,302 | 5/1972 | Braun | 251/139 |
| 3,677,290 | 7/1972 | Giesecke | 251/65 X |

*Primary Examiner*—William R. Cline
*Attorney, Agent, or Firm*—McDougall, Hersh & Scott

[57] ABSTRACT

A flow control valve for magnetic abrasive is disclosed. The valve employs a plurality of permanent magnets spaced around its circumference to set up a magnetic flux pattern. A valve disc of magnetic material mounted to a shaft for rotation is provided for controlling flow through the valve. When in the closed position, the disc completes the flux pattern set up by the magnets, preventing flow of magnetic abrasive through the valve without the need for effecting a complete mechanical seal.

13 Claims, 5 Drawing Figures

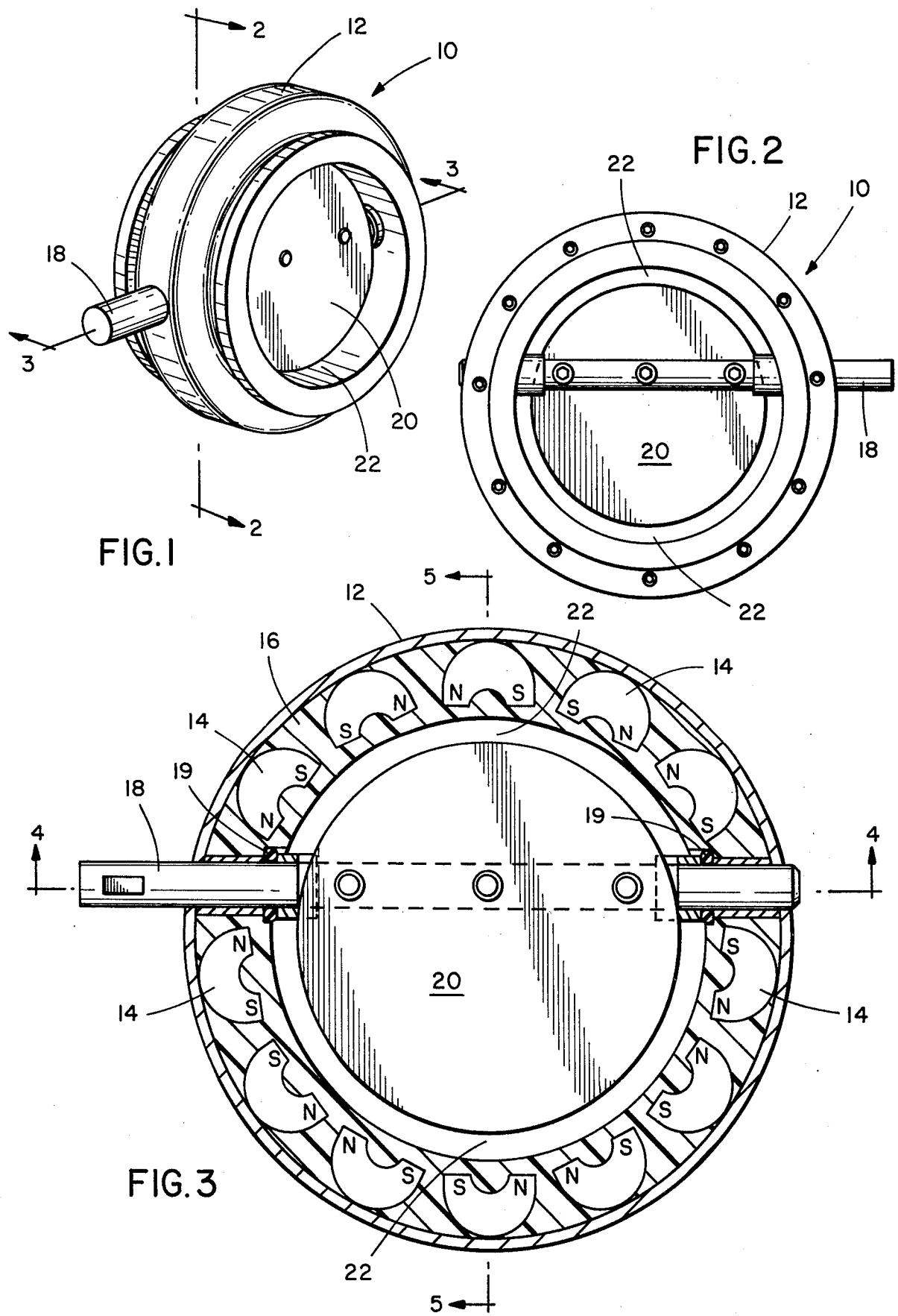

FLOW CONTROL VALVE FOR MAGNETIC PARTICULATE

BACKGROUND OF THE INVENTION

This invention relates to a field of flow control valves for particulate material. More specifically, it relates to flow control valves for magnetic abrasives such as steel shot, grit, and the like, or mixtures of magnetic abrasives and nonmagnetic abrasives wherein the magnetic abrasives constitute on the order of at least 50% of the mixture. Such particulate materials are utilized in many industrial applications for cleaning, abrading, preening, and otherwise treating surfaces. Often the particulate is projected against the surface to be treated by an abrasive throwing wheel as, for example, the airless centrifugal throwing wheels manufactured by Wheelabrator-Frye of Mishawaka, Indiana.

In providing a flow of particulate matter to such devices it is often necessary to employ flow control valves to regulate or, when necessary, completely stop the flow of abrasive from a supply hopper to a projection device. In many instances large heavy-duty flow valves are desirable and are known. However, in certain specific applications, it is necessary to provide miniaturized valves and in particular valves which are highly efficient and not subject to the usual mechanical wear problems.

It is accordingly an object of the present invention to provide an improved flow valve construction which is small in size and which can be employed for regulating the flow of particulate which includes a substantial portion of magnetic particles.

It is a further object of this invention to provide a flow control valve which does not require a complete mechanical seal and which has very low wear characteristics resulting therefrom.

It is another object of the invention to provide a flow control valve which employs magnetic flux fields as the controlling force for regulating particulate flow.

Other objects and advantages of the present invention will be apparent from the remaining portion of the specification.

BRIEF DESCRIPTION OF THE DRAWINGS

FIG. 1 is a perspective view of the flow control valve according to the present invention.

FIG. 2 is a rear elevational view of the flow control valve.

FIG. 3 is a front elevational view havig portions cut away.

DETAILED DESCRIPTION

Figure 4:
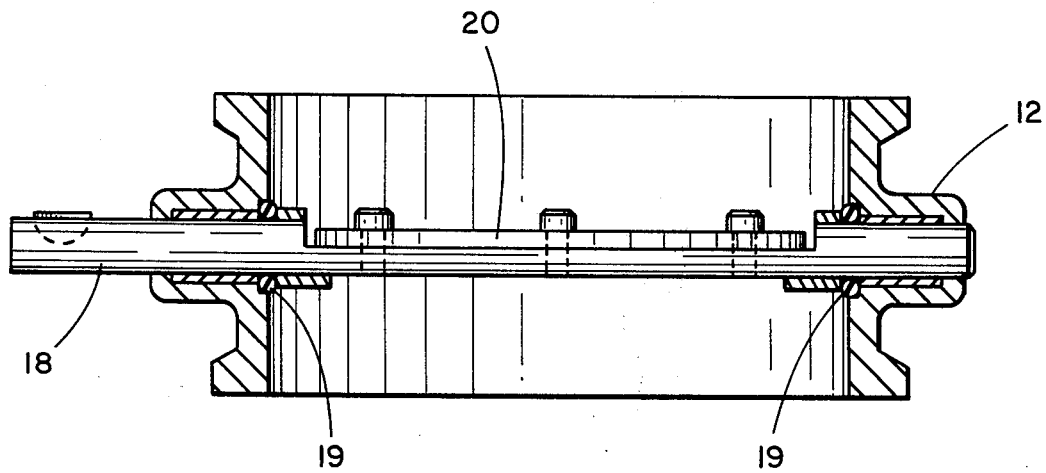
FIG. 4 is a sectional view taken along the lines 4—4 of FIG. 3.

Referring to the drawings, the flow control valve 10 has an outer U-shaped ring or housing 12 formed on non-magnetic material as, for example, aluminum. Provided in the underside of the housing are a plurality of permanent magnets 14 spaced approximately equidistant from each other around the housing circumference. The permanent magnets are secured in the housing 12 by use of an epoxy compound indicated generally at 16. Journaled through the housing 12 and the epoxy compound 16 is an aperture which receives a shaft 18 of nonmagnetic material, preferably stainless steel. The shaft is rotatable in the aperture and bears against the epoxy compound. Sealing O-rings 19 prevent dust from entering the aperture. Attached to the shaft 18 is a circular valve disc 20. The valve disc is made of magnetic material and is positioned in the plane of the ring of magnets 14. As will be appreciated, rotation of the shaf 18 is effective for rotating the valve disc 20 between the position indicated in FIG. 3 which restricts flow of material through the valve and an open position wherein the disc is substantially parallel to the flow of particulate.

Of particular importance to the present invention is the provision of an annular air gap 22 between the outside circumference of the disc 20 and the inside diameter of the housing 12. The provision of this air gap in a nonmagnetic valve would prevent proper operation inasmuch as abrasive would continue to flow past the disc even in its closed position. In an ordinary valve it is necessary to provide a mechanical seal against which the disc firmly seats to close off flow.

In the present invention, however, the provision of the air gap achieves a significant improvement over prior constructions in that the usual wear problems with seals are avoided. A mechanical seal is completely absent in the present design as it is not necessary. When the valve disc 20 is in the closed position, i.e., perpendicular to the direction of flow of abrasive, the disc 20, being of magnetic composition, completes a magnetic flux pattern across the valve. This is effective for forming a magnetic barrier to the flow of magnetic abrasive or abrasive having at least a 50% magnetic composition. The abrasive is magnetically prevented from flowing past the disc in the region of air gap 22 by the magnetic flux pattern between the disc and the permanent magnets. Abrasive flow is fully cut off without the need for a mechanical seal between the valve housing and the valve disc 20. It will be apparent that the disc also provides a mechanical barrier to the abrasive flow except in the region of the air gap.

Figure 5:
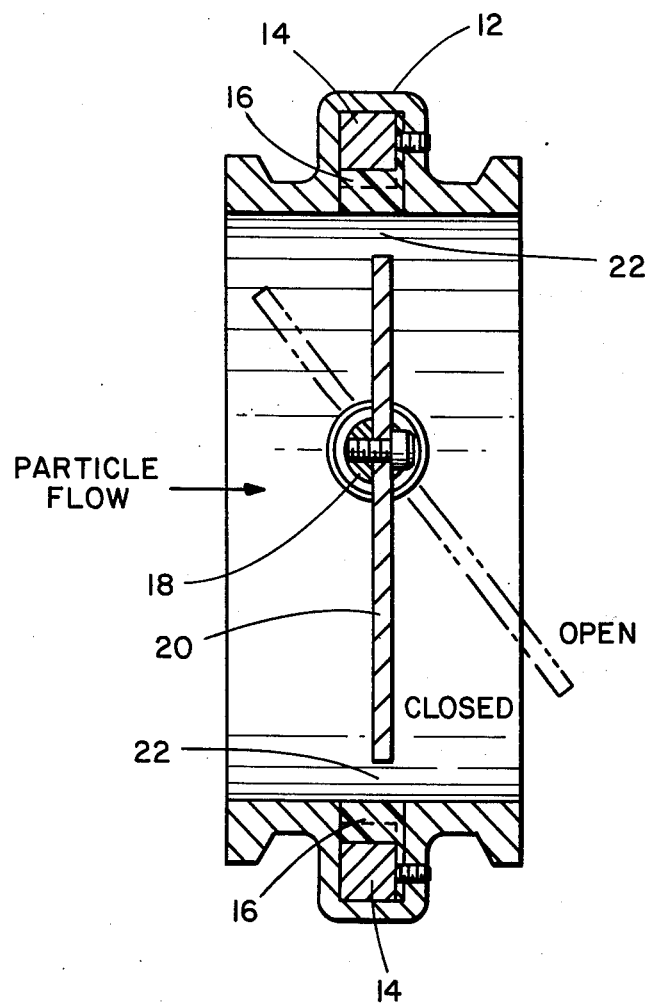
FIG. 5 is a sectional view taken along the lines 5—5 of FIG. 3.

As indicated in FIG. 5, in order to permit flow past the valve, the shaft 18 is rotated from the perpendicular position, relative to the direction of the abrasive flow, to various intermediate positions in order to achieve a desired flow rate. In order to keep the torque necessary for rotating shaft 18 as low as possible, it is desirable to locate the shaft off center with respect to the disc 20. That is, shaft 18 is located off center to unbalance the shot pressure on the valve disc when it is in the closed position. This off center mounting permits rotation of the valve from the closed position to an open position with lower torque on the shaft 18. If the shaft is not mounted slightly off center when the valve is in the closed position the abrasive behind the disc will compact and apply equal pressure to both sides of the valve disc, significantly increasing the required torque to open the valve.

The present invention is preferably intended for use in a gravity flow system and accordingly will usually be mounted to control the rate of particulate flow as, for example, from a storage hopper downwardly to a shot blasting device. It will of course be apparent that the valve has application in horizontal flow environments if desired. The only restriction as to its application being that in order to effect a complete interruption of abrasive flow, the abrasive must be composed of a substantial portion of magnetic material.

While I have shown and described embodiments of this invention in some detail, it will be understood that the description and illustrations are offered merely by way of example, and that the invention is to be limited in scope only by the appended claims.

I claim:

1. A magnetic flow control valve for particulate having a composition including at least 50% magnetic particles comprising:
   a. an annular housing;
   b. a plurality of magnets spaced around and secured to the circumference of said housing;
   c. a valve assembly including a magnetic valve disc rotatable in said housing between a position of magnetic attraction with said magnets to shut off particulate flow and a plurality of open positions permitting a selected particulate flow rate.

2. The device of claim 1 wherein said magnets are permanent magnets secured in said housing by epoxy binder.

3. The device of claim 1 wherein said valve assembly includes:
   a rotatable shaft journaled through said housing to which said disc is mounted.

4. The device according to claim 3 wherein said shaft is journaled through said housing off center with respect to the center of said housing to unbalance the particulate pressure on the valve disc to permit movement of the valve disc from its closed position to an open position with lower torque.

5. The device according to claim 3 wherein said disc has a diameter smaller than the inside diameter of said housing thereby to form an annular air gap between said disc and said housing to reduce wear on said disc by contact with said housing during operation of said valve disc.

6. A magnetic flow control valve for particulate having a composition including at least 50% magnetic particles comprising:
   a. an annular housing;
   b. a plurality of magnets spaced around and secured to the circumference of said housing;
   c. a rotatable nonmagnetic shaft journaled through said housing; and
   d. a valve disc of magnetic material positioned in said housing and attached to said shaft for rotation therewith between a closed position substantially perpendicular to the direction of flow of particulate through said valve in the plane of said magnets to create a mechanical and magnetic barrier to particulate flow and a plurality of open positions permitting a selected rate of particulate flow.

7. The device according to claim 6 wherein the housing is stainless steel.

8. The device according to claim 6 wherein said magnets are permanent horseshoe type magnets secured in said housing by an epoxy compound.

9. The device according to claim 8 wherein said epoxy compound forms a bearing sleeve for said shaft.

10. The device according to claim 6 wherein said shaft is formed of stainless steel.

11. The device according to claim 6 wherein said disc has a diameter smaller than the inside diameter of said housing thereby to form an annular air gap between said disc and said housing to reduce wear on said disc by contact with said housing during operation of said valve disc.

12. The device according to claim 6 wherein said shaft is mounted for rotation off center with respect to said housing and said disc to decrease the torque necessary to open the valve against the pressure of particulate on the valve disc.

13. The device according to claim 6 wherein the housing is aluminum.

* * * * *